(12) United States Patent
Malone et al.

(10) Patent No.: US 10,821,575 B2
(45) Date of Patent: Nov. 3, 2020

(54) CLAMP ASSEMBLY AND METHOD

(71) Applicant: Unison Industries, LLC, Jacksonville, FL (US)

(72) Inventors: Dennis Jerome Malone, Trenton, OH (US); Rodney Lee Delk, Arcanum, OH (US); Steven Douglas Tolle, Xenia, OH (US); Michael Umney, Dayton, OH (US)

(73) Assignee: Unison Industries, LLC, Jacksonville, FL (US)

( * ) Notice: Subject to any disclaimer, the term of this patent is extended or adjusted under 35 U.S.C. 154(b) by 228 days.

(21) Appl. No.: 15/968,230

(22) Filed: May 1, 2018

(65) Prior Publication Data

US 2019/0337125 A1 Nov. 7, 2019

(51) Int. Cl.
*B25B 5/06* (2006.01)
*F16B 2/22* (2006.01)
*F02C 7/20* (2006.01)

(52) U.S. Cl.
CPC .............. *B25B 5/062* (2013.01); *F02C 7/20* (2013.01); *F16B 2/22* (2013.01); *F05D 2220/323* (2013.01); *F05D 2230/64* (2013.01); *F05D 2230/68* (2013.01)

(58) Field of Classification Search
CPC .............. B23B 31/117; B23B 31/1175; B23B 31/1171; B25B 5/06; B25B 5/061; B25B 5/065; B25B 5/147; Y10T 279/1021; Y10T 279/1024; Y10T 279/1029; Y10T 279/1216; Y10T 279/1087
See application file for complete search history.

(56) References Cited

U.S. PATENT DOCUMENTS

| | | | | |
|---|---|---|---|---|
| 2,460,510 A | * | 2/1949 | Laesser | B23B 31/10 403/372 |
| 2,707,108 A | * | 4/1955 | Schottler | B23B 31/1177 279/54 |
| 3,542,354 A | * | 11/1970 | Fitzpatrick | B24B 33/10 269/22 |
| 3,578,364 A | * | 5/1971 | Ehrenberg | B23B 31/117 403/370 |
| 3,953,013 A | | 4/1976 | Griffith | |
| 4,286,894 A | | 9/1981 | Rongley | |
| 4,397,489 A | | 8/1983 | Lind | |
| 4,410,210 A | * | 10/1983 | de Sivry | B23B 31/305 294/119.3 |
| 4,560,289 A | | 12/1985 | Wood | |
| 4,857,690 A | * | 8/1989 | Kazlauskas | B23K 9/0286 219/60 A |
| 4,901,991 A | | 2/1990 | Bonkowski | |
| 4,989,909 A | * | 2/1991 | Bouligny, Jr. | B25B 5/065 188/67 |
| 5,746,423 A | | 5/1998 | Arov | |
| 5,969,256 A | | 10/1999 | Hobbs | |

(Continued)

FOREIGN PATENT DOCUMENTS

CN 205008608 U 2/2016

*Primary Examiner* — Tyrone V Hall, Jr.
(74) *Attorney, Agent, or Firm* — McGarry Bair PC

(57) ABSTRACT

A clamp assembly and method of clamping includes a fixture having a cavity formed by a facing surface. The facing surface in the clamp assembly can define a cavity periphery. In addition, a recess can be provided in the facing surface. An elastic member can be disposed within the recess.

21 Claims, 8 Drawing Sheets

(56) References Cited

U.S. PATENT DOCUMENTS

| | | | |
|---|---|---|---|
| 6,116,118 A | 9/2000 | Wesch | |
| 6,126,583 A * | 10/2000 | Stefani | B29C 41/042 |
| | | | 492/31 |
| 6,149,117 A | 11/2000 | Shao | |
| 6,182,977 B1 | 2/2001 | Weller | |
| 6,237,445 B1 | 5/2001 | Wesch, Jr. | |
| 6,688,871 B1 | 2/2004 | Lee | |
| 6,780,352 B2 | 8/2004 | Jacobson | |
| 6,811,160 B2 * | 11/2004 | Canela Vinas | B23B 31/223 |
| | | | 279/71 |
| 6,898,837 B1 | 5/2005 | Bennett | |
| 7,172,714 B2 | 2/2007 | Jacobson | |
| 7,402,265 B2 | 7/2008 | Jacobson | |
| 7,661,574 B1 * | 2/2010 | McGushion | B23K 37/0533 |
| | | | 228/44.5 |
| 9,360,075 B2 | 6/2016 | Johnson | |

* cited by examiner

CLAMP ASSEMBLY AND METHOD

BACKGROUND

Clamp assemblies are used in a variety of applications. In one exemplary application, the manufacturing of components for contemporary engines can include manufacturing duct sections for providing flow from a fluid source to a fluid destination. For example, in a turbine engine, a bleed air system can receive pressurized bleed air from a compressor section of the turbine engine and convey to a fluidly downstream component or system, such as an environmental control system.

The complexity and spacing requirements of turbine engines often require particular ducting paths in order to accommodate other engine components and maintain appropriate safety margins for the duct section. Clamp assemblies can be utilized to hold such duct sections securely in place during operations such as trimming, bending, machining, or installation of hardware.

BRIEF DESCRIPTION

In one aspect, the disclosure relates to a clamp assembly. The clamp assembly can include a fixture having a cavity formed by a facing surface, the facing surface defining a cavity periphery, a recess provided in the facing surface, and a visco-elastic member disposed within the recess and extending into the cavity beyond the facing surface.

In another aspect, the disclosure relates to a clamp assembly. The clamp assembly can include a base fixture having a base facing surface, a cap fixture removably coupled to the base fixture and having a cap facing surface confronting the base facing surface, at least one recess in one of the base facing surface and the cap facing surface, and at least one visco-elastic member disposed in the at least one recess.

In yet another aspect, the disclosure relates to a method of clamping a workpiece. The method includes providing a fixture having an aperture with at least one recess, disposing at least one visco-elastic member at least partially within the at least one recess, positioning a workpiece within the aperture, where an outer surface of the workpiece contacts the at least one visco-elastic member, applying a force to the workpiece via the at least one visco-elastic member, and maintaining a gap between the outer surface of the workpiece and the fixture.

DETAILED DESCRIPTION

Figure 1:
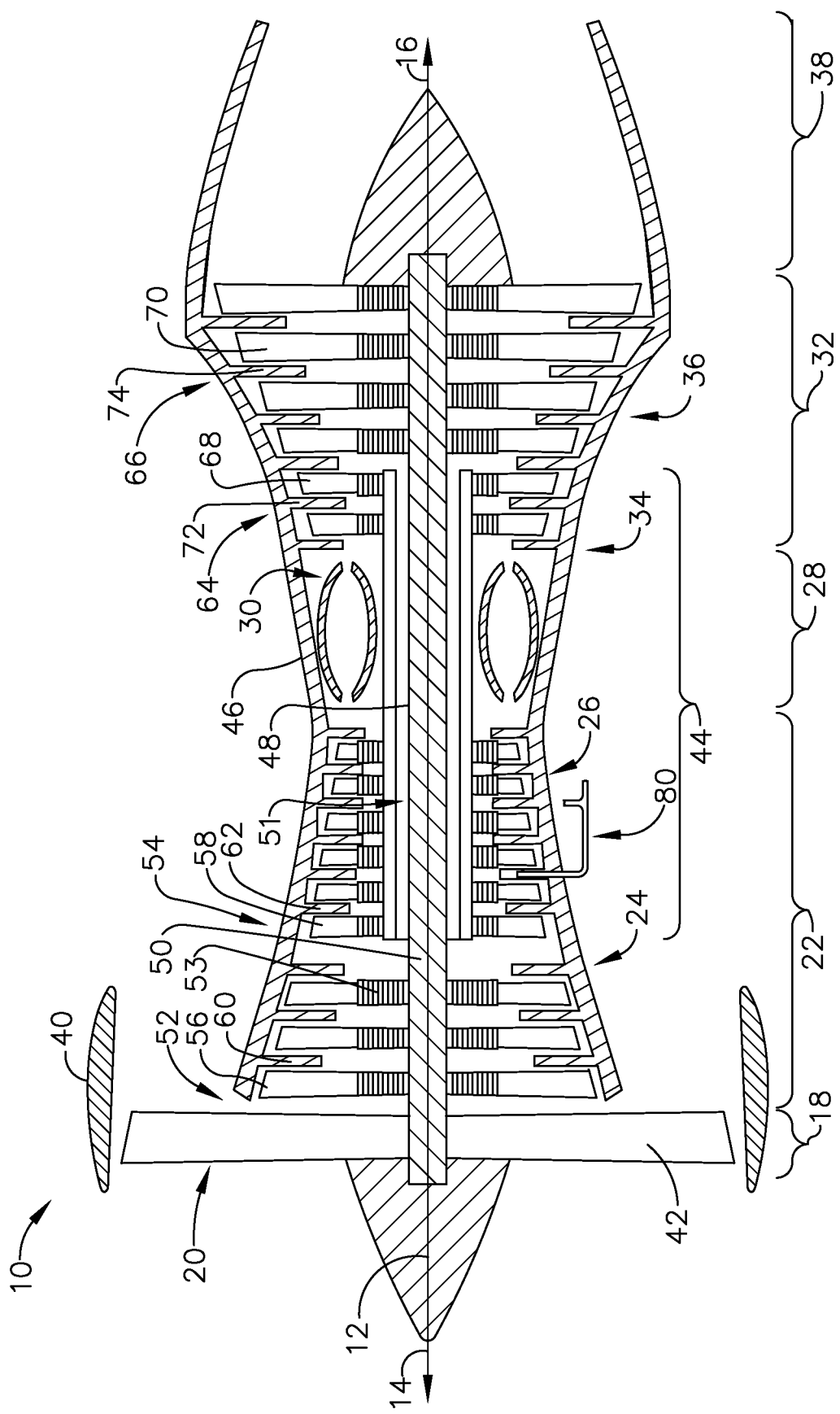
FIG. 1 is a schematic cross-sectional view of a gas turbine engine with a duct assembly in accordance with various aspects described herein.

Aspects of present disclosure are directed to a clamp assembly for gripping, fixing, or otherwise holding securely in place, a workpiece. For the purposes of illustration, the workpiece will be described with respect to a duct section that can be utilized in an engine. Such a duct section can be configured to provide a fluid flow from one portion of an engine to another. In one example the duct can include a curved or branched portion, such as to accommodate an inlet fluid flow being directed to various locations or branching into multiple outlet flows. In addition, the present disclosure will be described with respect to a turbine engine for illustrative purposes. Turbine engines have been used for land and nautical locomotion and power generation, but are most commonly used for aeronautical applications such as for airplanes, including helicopters. In airplanes, turbine engines are used for propulsion of the aircraft. It will be understood, however, that the disclosure is not so limited and can have general applicability in non-aircraft applications, such as other mobile applications and non-mobile industrial, commercial, and residential applications. The disclosure can also have general applicability for any desired workpiece, including hollow, solid, symmetric, or asymmetric workpieces in a variety of environments.

Fabrication of workpieces such as duct or tube sections often includes secondary operations like trimming. Such operations can be performed by machine (e.g. by lathe, mill, or endfinishing machine). Fabrication of workpieces with large diameters or overall widths often include manual operations such as abrasive cutoff, test fitting into a second workpiece or mount, scribing an intended trim point with weld shrink compensation, belt grinding, deburring, and the like, until a proper fit is achieved. Clamping or holding devices are typically utilized to fix a workpiece securely in place during fabrication or other operations.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference. Further, the terms "inlet" and "outlet" will refer to a fluid flow entry portion and exit portion, respectively. In an example where a fluid flow direction is changed, it can be appreciated that a former inlet can become an outlet, and vice versa.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another.

The exemplary drawings are for purposes of illustration only and the dimensions, positions, order, and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Additionally, the ducts, or metal tubular elements thereof, can also be a fluid delivery system for routing a fluid through the engine 10, including through the duct assemblies 80. The duct assemblies 80, such as air duct or other ducting assemblies leading either internally to other portions of the turbine engine 10 or externally of the turbine engine 10, can also include one or more metal tubular elements or metallic tubular elements forming ducts or conduits configured to convey fluid from a first portion of the engine 10 to another portion of the engine 10. It is further contemplated that the duct assemblies 80 can form branches, such as a first branch being fluidly coupled to a second branch at an intersection, or multiple branches sharing a common intersection, a common inlet, or a common outlet, in non-limiting examples.

Figure 2:
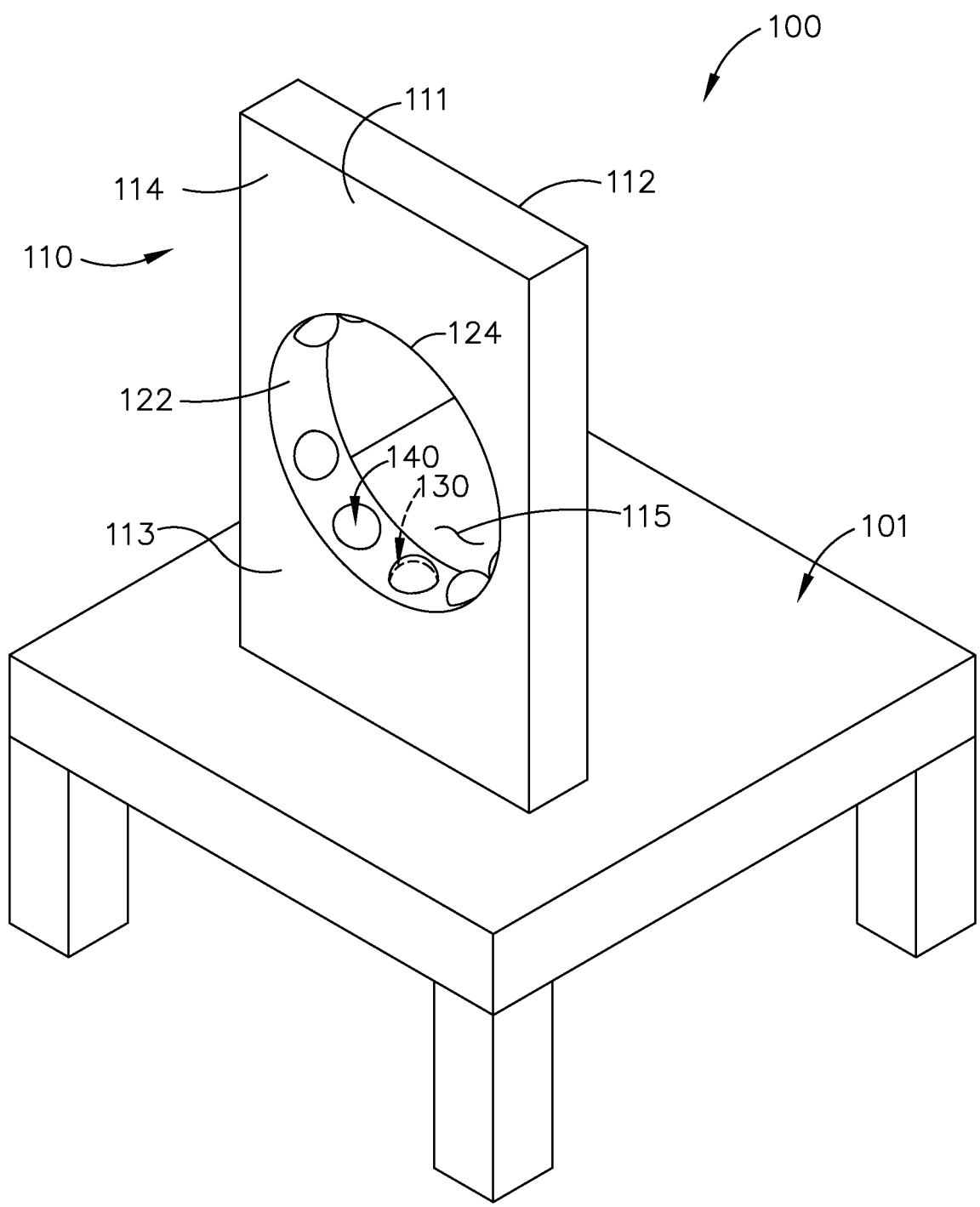
FIG. 2 is a perspective view of a clamp assembly in accordance with various aspects described herein that can be utilized to manufacture the duct assembly of FIG. 1.

Turning to FIG. 2, an exemplary clamp assembly 100 is illustrated that can be utilized to form or manufacture the duct assembly 80 of FIG. 1. The clamp assembly 100 includes a fixture 110 optionally mounted to a base 101, such as a table or mounting surface. The fixture 110 includes a first side 111 and a second side 112 spaced from the first side 111. The fixture 110 also includes a first end 113 and a second end 114, where the first end 113 can be coupled to the base 101 as shown. In addition, the fixture 110 can be formed of any desired material, including metallic materials such as steel, aluminum, or an alloy, in non-limiting examples.

A cavity 115 can extend into the fixture 110 from the first side 111. As used herein, "cavity" will refer to a hole such as a blind hold or a through hole. In the example of FIG. 2, the cavity 115 is illustrated in the form of a circular aperture or through-hole extending through the fixture 110 from the first side 111 to the second side 112. In another non-limiting example, the cavity 115 can also be formed as a blind hole extending partially into the fixture 110. It will be understood that any desired geometric profile can be used for the cavity 115, including square, rectangular with rounded or beveled corners, or irregular/asymmetric. It is further contemplated that the geometric profile of the cavity can be complementary to that of a part being held.

The cavity 115 can be formed by a facing surface 122 as shown, where the facing surface 122 defines a cavity periphery 124. At least one recess 130 can be provided in the facing surface 122. In the illustrated example, a plurality of recesses 130 are shown provided in, and spaced about, the facing surface 122.

A visco-elastic (VE) member 140 can be disposed within a recess 130 and can extend into the cavity 115 beyond the facing surface 122 as shown. More specifically, multiple VE members 140 can be disposed in at least some of the multiple recesses 130. The VE member 140 can be formed of any desired visco-elastic material for use in the desired environment, such as amorphous polymers, semicrystalline polymers, or biopolymers, in non-limiting examples. The VE member 140 is illustrated as essentially spherical, and can also have any desired geometric profile such as conical, cylindrical, rectilinear, toroidal, or otherwise three-dimensionally polygonal, in non-limiting examples.

It should be appreciated that visco-elastic materials exhibit both viscous and elastic properties. For example, a purely elastic material can immediately deform to a compressed state under an applied stress and "snap back" to its relaxed state upon removal of that applied stress. VE materials have a material "creep" wherein deformation to a compressed state does not immediately occur under an applied stress, and relaxation to an original, uncompressed state does not immediately occur upon removal of such applied stress. Such material creep is often characterized by a relaxation time; in one non-limiting example, a relaxation time for 1,4-polyisoprene was approximately 2 seconds under an applied stress of 50 kPa. Furthermore, VE materials under sufficient applied stress (or under any applied stress during a sufficiently short time interval) can harden and behave like a solid material, otherwise known as a "glassy phase."

Figure 3:
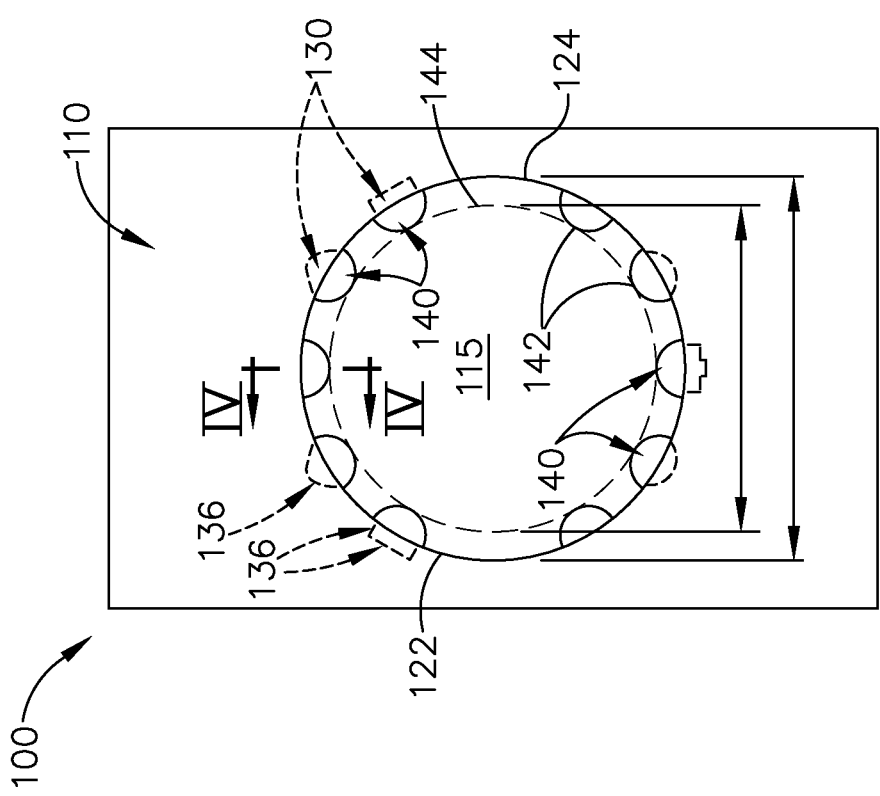
FIG. 3 is a front view of the clamp assembly of FIG. 2 illustrating visco-elastic members in accordance with various aspects described herein.

FIG. 3 illustrates a front view of the fixture 110, where it can more clearly be seen that the VE members 140 disposed within the recesses 130 can extend into the cavity 115. More specifically, each of the VE members 140 can terminate in a terminal end 142 that extends into the cavity 115. The terminal ends 142 can at least partially define an effective fixture periphery 144 smaller than the cavity periphery 124. In the illustrated example, the cavity periphery 124 and effective fixture periphery 144 are the same shape, e.g. circular, where the effective fixture periphery has a smaller diameter than that of the cavity periphery 124. It can be appreciated that the peripheries 124, 144 can be formed with any desired shape or geometric profile, including having differing shapes. For example, the cavity periphery 124 can be formed as circular while the effective fixture periphery 144 can be formed in a rounded rectangular shape. It can be appreciated that selected positioning of VE members 140 in the recesses 130 can be utilized to tailor the shape of the effective fixture periphery 144.

In addition, the recesses 130 can be defined by at least one inner surface 136 within the facing surface 122. It is contemplated that the recesses 130 can be formed with any desired geometric profile, such as cylindrical, hemispherical, conical, countersunk, or counterbore, in non-limiting examples. Other geometries such as toroidal or irregular, or containing additional features such as surface roughness or channels are also contemplated for use. In a non-limiting example, a VE member 140 can have a complementary geometry to that of its corresponding recess 130, e.g. a hemispherical recess 130 and spherical VE member 140, or conical recess 130 and conical VE member 140. In another non-limiting example, the recess 130 can be formed with a cylindrical shape and receive a spherical VE member 140.

Figure 4:
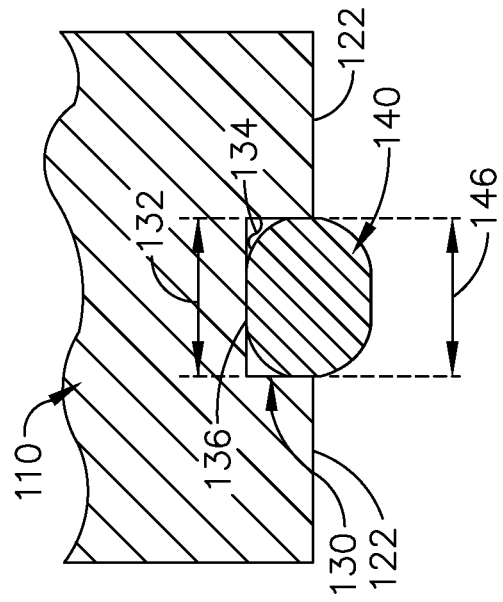
FIG. 4 is a cross-sectional view of the clamp assembly of FIG. 3 along the line IV-IV.

Turning to FIG. 4, a cross-sectional view taken along the line IV-IV of FIG. 3 is shown. It is contemplated that the VE member 140 can be disposed in the recess 130 via an interference fit, where the VE member 140 has a first width 146 slightly larger than a second width 132 of the recess 130, and where partial compression of the VE member 140 occurs while disposed within the recess 130. In a non-limiting example, the first width 146 of the VE member 140 can be larger than the second width 132 of the recess 130 by 2 mm or less. Further, the VE member 140 can completely or partially fill the recess 130, and is illustrated with a space 134 formed between the VE member 140 and an inner surface 136 of the recess 130. It is also contemplated that the VE member 140 can be removably disposed within the recess 130, e.g. VE members 140 can be removed or placed in different recesses 130 to accommodate varying workpieces.

Figure 5:
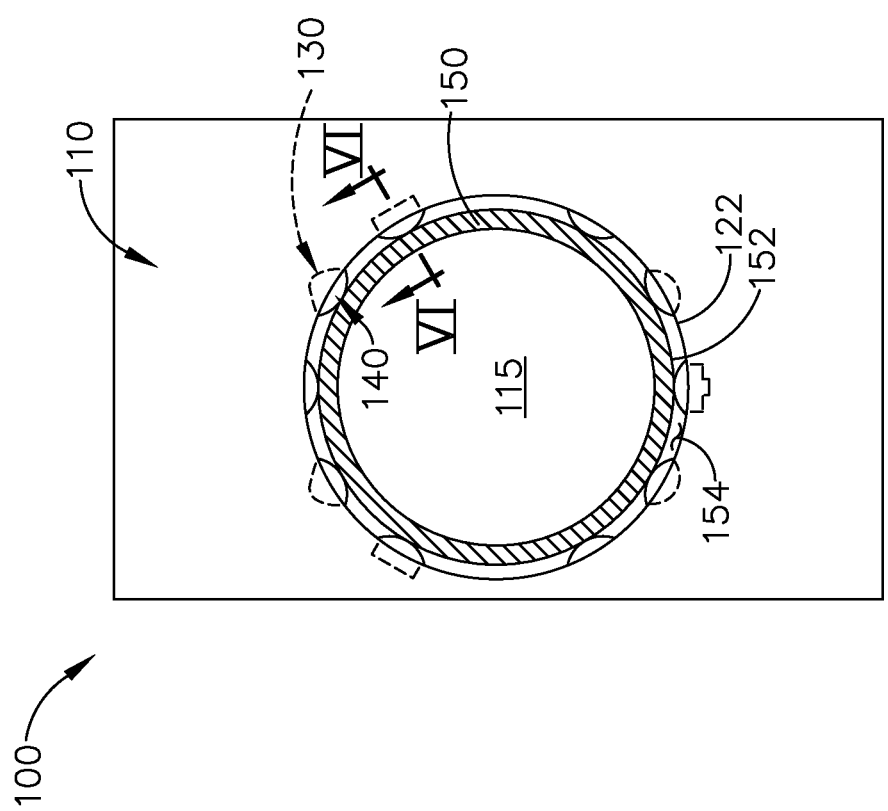
FIG. 5 is a front view of the clamp assembly of FIG. 2 holding a workpiece in accordance with various aspects described herein.

FIG. 5 illustrates the clamp assembly 100 in operation, where a workpiece 150 (e.g. a portion of the duct assembly 80) is positioned within the cavity 115 (e.g. inserted into the cavity 115). It is contemplated that the workpiece 150 can be slid into the cavity 115. More specifically, an outer surface 152 of the workpiece 150 can contact the VE members 140 and cause them to compress, allowing the workpiece 150 to be positioned within the cavity 115. Once inserted into a desired holding position, the VE members 140 can settle against the outer surface 152 of the workpiece 150 (e.g. after an elapsed time at least equal to a characteristic relaxation time of the VE members 140). Once settled, the VE members 140 exert a collective force on the workpiece 150 such that the workpiece 150 is held in a stationary or clamped position for operations such as trimming, machining, fitting, or the like. The VE members 140 can each compress independently when acted on by the workpiece contact surface 152 such that any anomalies in workpiece profile are accommodated within the compression range of the VE terminal end 142. In addition, the settled VE members 140 maintain a gap 154 between the facing surface 122 of the fixture 110 and the outer surface 152 of the workpiece 150. It can be appreciated that holding or clamping forces exerted on the workpiece 150 are exerted solely through the VE members 140. In addition, when compressed or settled into a clamping position, it is contemplated that the VE members 140 can extend farther into the recesses 130 as compared to the example shown in FIG. 4. In a non-limiting example, a VE member can completely fill a recess 130 when under compression. It is contemplated that a volumetric size of the recess 130 and volumetric size of a corresponding VE member 140 can each be selected based on factors such as a desired amount of clamping force, workpiece material properties such as rigidity or compressive strength, or local geometries along the workpiece, in non-limiting examples.

Figure 6:
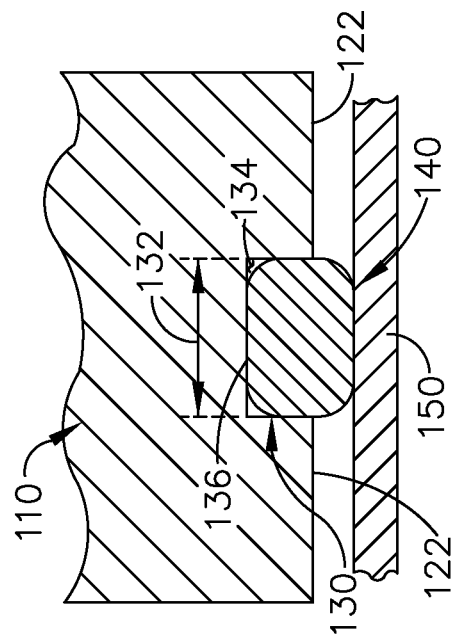
FIG. 6 is a cross-sectional view of the clamp assembly of FIG. 5 along the line VI-VI.

Turning to FIG. 6, a cross-sectional view taken along the line VI-VI of FIG. 5 is shown wherein the VE member 140 is compressed and settled into its clamping position against the workpiece 150. In the illustrated example, the VE member 140 in its compressed state can be moved further into the recess 130 as compared to its position illustrated in FIG. 4, and contact a greater portion of the at least one inner surface 136. Optionally, it is contemplated that a space 134 can still exist between the VE member 140 and inner surface 136. In another non-limiting example, the recess 130 can be formed with a size great enough to receive the entire VE member 140 and still maintain the space 134. It can also be appreciated that in the compressed state the terminal end 142 of the VE member 140 contacts the outer surface 152 of the workpiece.

It can be appreciated that with increased clamping force applied to the workpiece 150 by the VE member 140, the VE member 140 can become increasingly resistant to compression due its visco-elastic material properties as discussed above. Such resistance to compression can be altered based on a geometric profile or shape of the VE member. Non-limiting aspects of the disclosure can be included wherein an inner surface of the recess can be made to be adjustable, such as by use of screw-thread-movable hardware, such that a volumetric size of the recess 130 can be mechanically modulated over a predetermined range during a clamping process. In another non-limiting example, a shim or other spacer could be inserted into a given recess before insertion of a VE member into the recess, thereby tailoring a volumetric size or geometric profile of predetermined recesses about the cavity.

Figure 7:
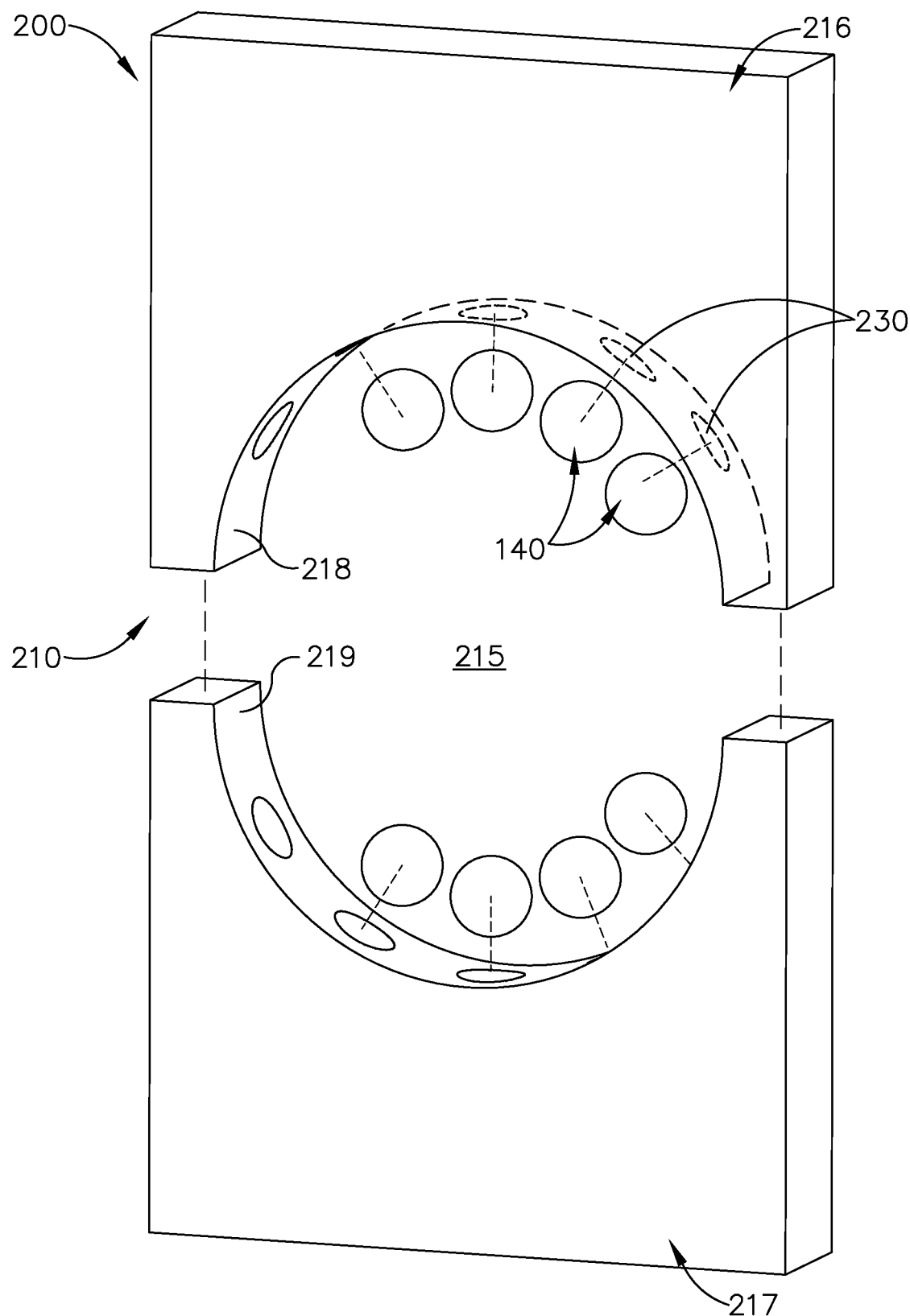
FIG. 7 is an exploded view of an alternate clamp assembly in accordance with various aspects described herein that can be utilized to manufacture the duct assembly of FIG. 1.

Referring now to FIG. 7, another clamp assembly 200 is illustrated that can be utilized to form or manufacture the duct assembly 80 of FIG. 1. The clamp assembly 200 is similar to the clamp assembly 100; therefore, like parts will be identified with like numerals increased by 100, with it being understood that the description of the like parts of the clamp assembly 100 applies to the clamp assembly 200, except where noted.

In the exploded view shown, the clamp assembly 200 includes a fixture 210. One difference is the fixture 210 includes a cap fixture 216 and a base fixture 217. The cap fixture 216 includes a cap facing surface 218, and the base fixture 217 includes a base facing surface 219. In addition, the cap facing surface 218 and base facing surface 219 at least partially define a cavity 215 through the fixture 210, where the cavity 215 also includes a cavity periphery 224.

At least one recess 230 can be formed in either or both of the cap and base facing surfaces 218, 219. At least one visco-elastic member 140 can be disposed in the at least one recess 230, including by use of an interference fit as described above. In the illustrated example it can be seen that at least one recess 230 can be left empty, with no VE member 140 disposed therein.

The cap fixture 216 can be removably coupled to the base fixture 217. When assembled, the cap and base fixtures 216, 217 can be coupled to the base fixture 217, e.g. through the use of attachment hardware such as bolts, screws, or clamps, or by complementary features on each fixture 216, 217 such as a dovetail or keyed feature. The cap facing surface 218 confronts the base facing surface 219, and the VE members 140 disposed in the recesses 230 extend into the cavity 215 beyond the facing surfaces 218, 219.

Figure 8:
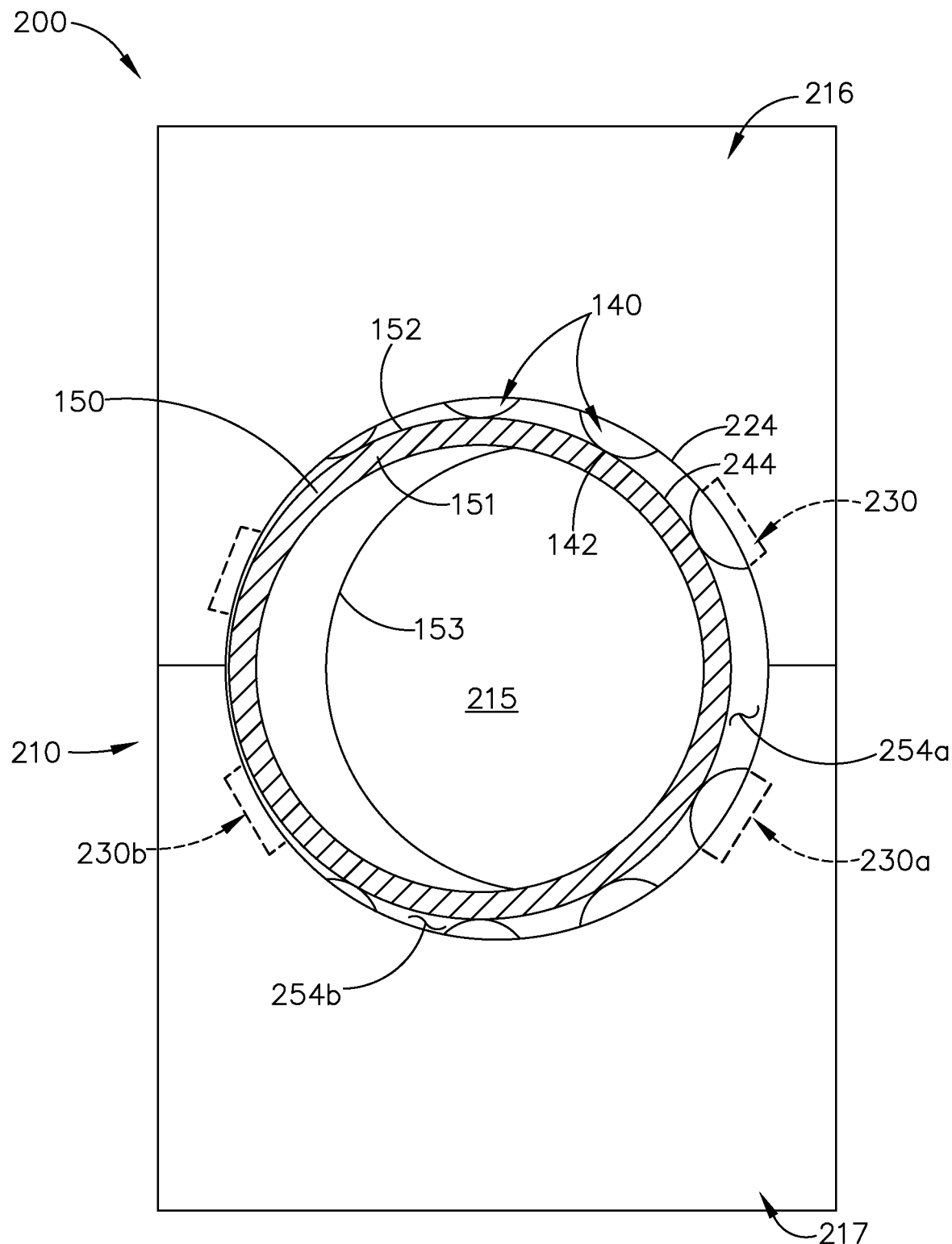
FIG. 8 is a front view of the clamp assembly of FIG. 6 holding a workpiece in accordance with various aspects described herein.

FIG. 8 illustrates a front view of the assembled fixture 210 with the workpiece 150 inserted into the cavity 215. Multiple VE members 140 are disposed in multiple recesses 230, and the workpiece 150 is held by the VE members 240. Terminal ends 142 of the VE members 140 can define an effective fixture periphery 244 which coincides with the workpiece outer surface 152 while inserted into the cavity 215. It can be appreciated that the effective fixture periphery 244 is smaller than the cavity periphery 224.

In addition, gaps are formed between the outer surface 152 of the workpiece 150 and each of the cap and base facing surfaces 218, 219. One difference is that the workpiece 150 is biased within the cavity 215. More specifically, a first gap 254a proximate a first recess 230a is larger than a second gap 254b proximate a second recess 230b. The first recess 230a has a VE member 140 disposed therein, and the second recess 230b is left empty. It can be appreciated that the asymmetric distribution of VE members 140 within the recesses 230 can bias the workpiece 150. In another non-limiting example, biasing can also be accomplished by utilizing VE members having varied durometers or resistances to compression when positioning within the recesses, such that the workpiece is pushed away from less-compressible VE members toward the more-compressible VE members. In the front view shown, a first end 151 of the workpiece 150 is visibly offset from a second end 153 of the workpiece 150, where the interior of the workpiece 150 is visible between the ends 151, 153. It can be appreciated that a workpiece that has a geometric size or profile that varies from nominal, but is still within allowable tolerances or limits, can be accommodated in the fixture 210 as the VE members 140 locally conform to such anomalies. In this manner, the VE members 140 can average a variable form of the workpiece 150 within the invariable form of the fixture 210.

Figure 9:
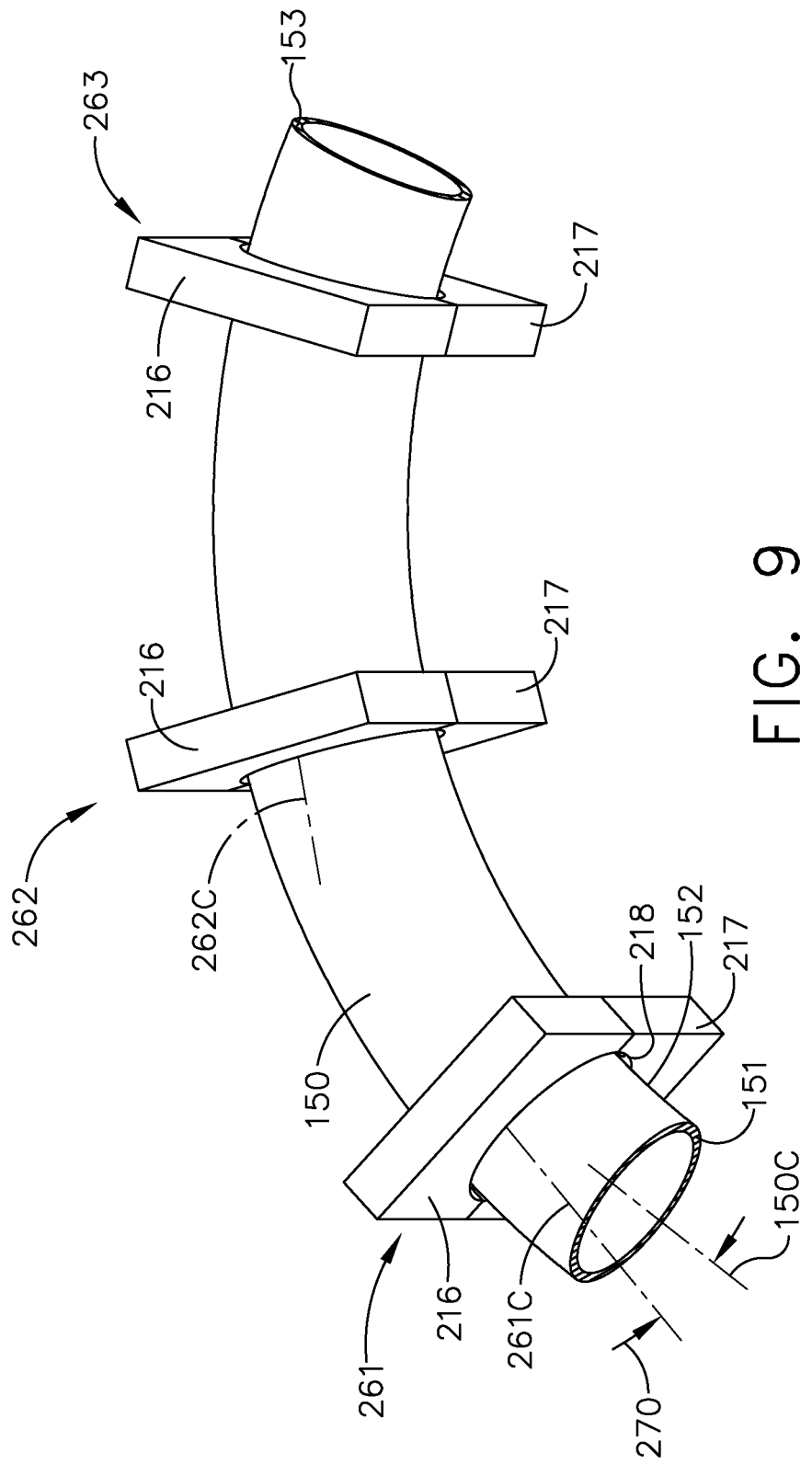
FIG. 9 is a perspective view of an alternate clamp assembly in accordance with various aspects described herein that can be utilized to manufacture the duct assembly of FIG. 1.

FIG. 9 illustrates the workpiece 150 positioned within multiple fixtures, shown as a first fixture 261, a second fixture 262, and a third fixture 263. The fixtures 261, 262, 263 are each illustrated as including cap fixtures 216 and base fixtures 217; it is contemplated that the fixture 110 of FIG. 2 can also be utilized.

The workpiece 150 is biased within the first fixture 261. In the perspective view of FIG. 8, the biasing can be more clearly seen wherein a centerline 150c of the workpiece 150 is unaligned with a centerline 261c of the cavity 215. The respective centerlines 150c, 261c of the workpiece 150 and the first fixture 261 can define a bias angle 270 therebetween. It can be appreciated that an unbiased workpiece would form a 0-degree bias angle 270 between the centerlines 150c, 261c.

In addition, the fixtures 261, 262, 263 can be arranged in a variety of ways to account for workpiece geometry. In the illustrated example, the first fixture centerline 261c is unaligned with a second fixture centerline 262c of the second fixture 262 to account for the curvature of the workpiece 150.

It should be appreciated that any number of fixtures can be utilized to hold or clamp the workpiece, and any or all of the fixtures can account for workpiece profile deviation from nominal or bias the workpiece as desired.

Figure 10:
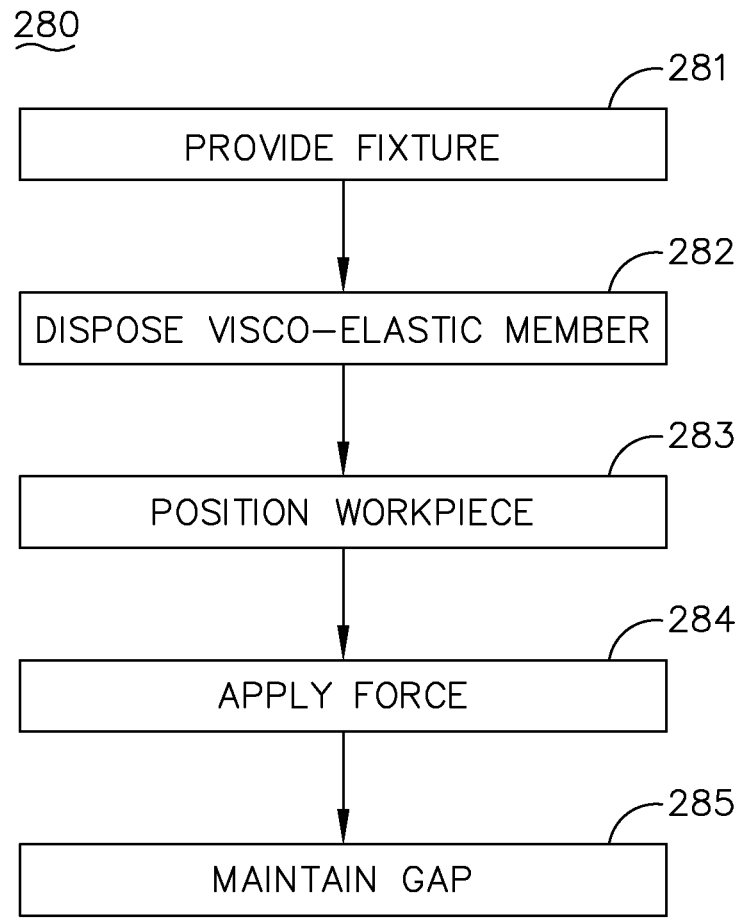
FIG. 10 is a flowchart illustrating a method of clamping a workpiece in accordance with various aspects described herein.

FIG. 10 is a flowchart illustrating a method 280 of clamping a workpiece, such as the workpiece 150 or duct assembly 80. At 281 a fixture is provided, such as the fixture 110, 210 having a cavity 115, 215 with at least one recess 130, 230. At 282 at least one visco-elastic member, such as the VE member 140, can be disposed at least partially within the at least one recess 130, 230. At 283 a workpiece can be positioned within the cavity, where an outer surface 152 of the workpiece contacts the at least one visco-elastic member 140. At 284 a force can be applied to the workpiece 150 via the at least one VE member 140, and at 285 a gap 154, 254a, 254b can be maintained between the outer surface 152 of the workpiece 150 and the fixture 110, 210. It should be appreciated that any variations in form of the workpiece 150 can be accommodated within the limits of the geometry of the facing surface 122 as described above. A workpiece 150 whose outer surface 152 is deviated in form can be located and gripped by the VE 140 under independent compression, thereby maintaining overall grip on the workpiece surface 152 sufficient to perform mechanical operations (such as machining) without distorting from virtual condition. In this manner the VE members 140 can register a non-nominal part geometry as if it were nominal within the confines of the facing surface 122. Optionally, the workpiece can be biased within the cavity 115, 215, e.g. as shown in FIG. 6. Optionally, at 283 the positioning can further include positioning the workpiece between the cap fixture 216 and the base fixture 217, wherein the cap and base fixtures 216, 217 at least partially define the cavity 215.

Aspects of the present disclosure provide for a variety of benefits. Workpieces having various tolerances can be held in a common fixture by way of being able to slip past the VE members and into the cavity during clamping. After a characteristic or relaxation time, the VE members can equilibrate to end in a nominal resting condition against the workpiece. In one example where the cap fixture is tightened against the base fixture with the workpiece held therebetween, the workpiece is clamped or held against the VE members about its periphery with a symmetrical force. It can be appreciated that the lack of any single-point contact between the workpiece and the rigid tool or fixture can prevent undesirable local distortions of the workpiece during clamping.

In addition, the additive force of the VE members (e.g. visco-elastic balls) in one example is approximately 1400 lb-f (or approximately 6200 N) yet the workpiece is not deformed or crushed during clamping. One benefit of the use of a plurality of visco-elastic members is that the additive force of the members is sufficient to fixedly retain the workpiece against machine forces, such as holding stationary for tube trimming operations. Further, the visco-elastic properties of the members provide for impedance of cyclic vibrations associated with operations such as multiple tooth milling cutting, and such properties can also prevent vibrational deflections in the workpiece during the operation (e.g. while the cutter is engaged).

It can be further appreciated that aspects of the present disclosure can have general applicability in a variety of environments, some of which are described below.

In one example within an orthopedic setting, a long bone fracture may be reduced and temporarily or permanently stabilized with a fixture utilizing VE members surrounding the bone, especially in situations where it is undesirable to intrude into the bone with mechanical fasteners. Such an example could also involve mapping the bone fragments within the fracture, and the solid bone remaining adjacent the fracture, using computed tomography or other 3D scan. From this mapping, an external non-contact scaffold or fixture could be constructed (e.g. from titanium) about which the VE members can be positioned. It is also contemplated that such a fixture and VE members could be constructed as "implant grade" to stabilize the bone during an extended healing process and be removed at a later time.

In another example, aspects of the present disclosure could be applied in a type of slip clutch or self-regulating fusible link in a mechanical structure. Such a fusible link can be utilized to allow rotary or linear movement between two solid elements within a specific range of loading, to be immediately available for the same range of loading in a serial application after the first overloading event is dissipated. For example, the fixture as described herein can be modified to couple to (or be formed as) a first solid element, and the VE members can couple to a second solid element. The second solid element under an applied torque can be held stationary by the VE members up to a predetermined threshold value, at which point the second solid element can "slip" or rotate within the cavity or aperture and adjacent the VE members. The visco-elastic properties of the members can provide for re-engagement of the second solid element, now rotated by some angular measure with respect to its original position within the aperture. The addition of lubrication and engineered polymer selection for the visco-elastic members can greatly increase the working lifetime of such a VE slip-clutch system compared to traditional systems.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A clamp assembly comprising:
   a fixture having a cavity formed by a facing surface, the facing surface defining a cavity periphery;
   a recess provided in the facing surface; and
   a visco-elastic member disposed within the recess and extending into the cavity beyond the facing surface.

2. The clamp assembly of claim 1 further comprising multiple recesses provided in the facing surface and multiple visco-elastic members disposed in at least some of the multiple recesses.

3. The clamp assembly of claim 2 wherein the multiple recesses are spaced about the facing surface.

4. The clamp assembly of claim 2 wherein each of the multiple visco-elastic members terminates in a terminal end to at least partially define an effective fixture periphery smaller than the cavity periphery.

5. The clamp assembly of claim 4 wherein the cavity periphery and the effective fixture periphery are the same shape.

6. The clamp assembly of claim 1 further comprising multiple fixtures.

7. The clamp assembly of claim 6 wherein a centerline of a first fixture is unaligned with a centerline of a second fixture.

8. The clamp assembly of claim 1 wherein the visco-elastic member partially fills the recess.

9. The clamp assembly of claim 1 wherein the visco-elastic member is removably disposed within the recess.

10. The clamp assembly of claim 1 wherein the visco-elastic member is disposed in the recess via an interference fit.

11. The clamp assembly of claim 1 wherein the recess has a geometric profile that is one of cylindrical, hemispherical, conical, countersunk, or counterbore.

12. The clamp assembly of claim 1 wherein the visco-elastic member has a geometric profile that is one of spherical, conical, cylindrical or toroidal.

13. A clamp assembly, comprising:
a base fixture having a base facing surface;
a cap fixture removably coupled to the base fixture and having a cap facing surface confronting the base facing surface;
at least one recess in one of the base facing surface and the cap facing surface; and
at least one visco-elastic member disposed in the at least one recess.

14. The clamp assembly of claim 13 wherein the base facing surface and cap facing surface at least partially define a cavity with a cavity periphery.

15. The clamp assembly of claim 14 further comprising multiple recesses in one of the base facing surface and the cap facing surface, and multiple visco-elastic members disposed in at least some of the multiple recesses.

16. The clamp assembly of claim 15 wherein each of the multiple visco-elastic members terminates in a terminal end to at least partially define an effective fixture periphery smaller than the cavity periphery.

17. A method of clamping a workpiece, the method comprising:
providing a fixture having a cavity with at least one recess;
disposing at least one visco-elastic member at least partially within the at least one recess;
positioning a workpiece within the cavity, where an outer surface of the workpiece contacts the at least one visco-elastic member;
applying a force to the workpiece via the at least one visco-elastic member; and
maintaining a gap between the outer surface of the workpiece and the fixture.

18. The method of claim 17 further comprising biasing the workpiece within the cavity, wherein a centerline of the workpiece is unaligned with a centerline of the cavity.

19. The method of claim 18 wherein the maintaining further comprises maintaining a first gap proximate a first recess and a second gap proximate a second recess, the first gap being larger than the second gap.

20. The method of claim 17 wherein the positioning further comprises positioning the workpiece between a base fixture and a cap fixture, wherein the base fixture and cap fixture at least partially define the cavity.

21. The method of claim 17 further comprising compressing the at least one visco-elastic member to accommodate a variable geometry of the workpiece within the cavity.

* * * * *